United States Patent Office 3,000,818
Patented Sept. 19, 1961

3,000,818
WELL COMPLETION AND WORKOVER FLUID
Robert H. Abbott, Jr., Houma, La., assignor to Texaco Inc., a corporation of Delaware
No Drawing. Filed Sept. 18, 1958, Ser. No. 761,698
7 Claims. (Cl. 252—8.55)

This invention relates to well completion or workover fluids. More particularly, this invention relates to aqueous well completion or workover fluids, and compositions for the preparation of the same, useful in connection with well treating operations, especially wherein the well undergoing treatment penetrates shaley formations.

In a well treating operation, or in a well completion operation, it is desirable to employ during the treating operation a fluid which does not impair the permeability or productivity of the petroleum producing formations penetrated by the well bore. More particularly, in a well treating operation it is desirable to employ as the well treating fluid a fluid which does not swell and/or hydrate shaley material or bentonitic type material in the formations undergoing treatment. To this end it has been the practice heretofore to employ as workover fluids brines such as aqueous solutions of calcium chloride and/or sodium chloride since these brine solutions do not hydrate or swell shaley material or bentonitic type material in contact therewith. One disadvantage, however, of employing this type of completion fluid is that it is difficult to obtain a relatively high density fluid without adding or incorporating in such fluids solid materials such as clay and weighting material such as barium sulfate. When clayey material is dispersed in such treating fluids the finely dispersed clayey particles tend to penetrate the interstices of the formation undergoing treatment and to seal off these formations or reduce the permeability thereof.

Accordingly it is an object of this invention to provide an improved aqueous well completion or workover fluid and compositions useful for the preparation of such fluids.

Another object of this invention is to provide a substantially solids-free, e.g., clay-free, fluid which not only inhibits the hydration of shaley material or bentonitic type material in contact therewith but which also tends to solidify and harden these materials and render these materials more competent.

It is another object of this invention to provide an improved aqueous well completion or workover fluid which is readily adaptable to variation in specific gravity.

How these and other objects of this invention are accomplished will become apparent in the light of the accompanying disclosure. In at least one embodiment of the practice of this invention at least one of the foregoing objects will be achieved.

It has now been discovered that an improved aqueous well completion or workover fluid is provided by forming a substantially saturated aqueous solution of calcium hydroxide, said solution having a calcium ion concentration in excess of 200 parts per million by weight, and by incorporating therein a sufficient amount of a suitable water soluble compound. In the practice of this invention the amount of water soluble compound incorporated in the aqueous fluid is sufficient to yield a fluid having the desired specific gravity or weight as measured by lbs. per gallon. A well completion fluid prepared in accordance with this invention not only does not hydrate or cause shaley material or bentonitic type material to swell, but rather such solutions tend to harden, render more competent and stabilize such materials.

An aqueous fluid prepared in accordance with this invention is alkaline and will exhibit a pH not in excess of 12.6, the pH of a saturated aqueous solution of calcium hydroxide. Suitable shale hardening fluids have been prepared having a pH in the range 10.2–12.0. Sufficient calcium hydroxide is present in the aqueous fluids to form a substantially saturated solution thereof. Desirably there is also incorporated in the aqueous drilling fluid a water soluble calcium salt, that is a calcium salt which has a solubility in water greater than that of calcium hydroxide, in an amount sufficient so that the calcium ion concentration of the resulting aqueous solution is in excess of 200 parts per million by weight (p.p.m.), desirably in the range 300–1000 p.p.m., more or less.

In the preparation of the aqueous fluid in accordance with this invention the calcium hydroxide may be added directly to water as burnt lime (CaO) or as slaked lime $Ca(OH)_2$ or may be formed in situ by metathetical reaction between a suitable base such as an alkali metal base, for example sodium hydroxide, and a suitable water soluble calcium salt such as calcium chloride.

Any suitable water soluble calcium salt which has a solubility in water greater than that of calcium hydroxide may be employed in the practice of this invention. Suitable water soluble calcium salts include calcium chloride, calcium sulfate, calcium acetate, calcium gulconate, calcium citrate, calcium formate and calcium nitrate. Other suitable calcium salts are known and are useful in the practice of this invention.

The water soluble compound incorporated in the aqueous drilling fluids of this invention in sufficient amount necessary to attain the desired specific gravity or weight per gallon of the resulting fluid may be any water soluble organic or inorganic compound compatible therein. More specifically, any suitable water soluble compound may be incorporated as the dissolved weighting agent in the practice of this invention provided it does not neutralize or react with the calcium hydroxide, hydroxyl ion, chloride ion, calcium ion or any other component therein to render the same ineffective or lead to the precipitation of solid materials.

The following inorganic materials, all water soluble inorganic salts, are suitable for the preparation of aqueous fluids in accordance with this invention: the chlorides, bromides, fluorides, nitrates, nitrites, thiocyanates, chlorates, permanganates of potassium, sodium, lithium, rubidium, cesium, barium, strontium and calcium. Specifically such materials as potassium chloride, potassium nitrate, sodium nitrate, sodium acetate, potassium acetate, sodium citrate, sodium thiocyanate, sodium nitrite, potassium nitrate, calcium acetate, sodium chlorate, sodium permanganate, potassium chlorate, potassium permanganate, lithium chloride, lithium nitrate, lithium acetate, and the like are useful in the preparation of aqueous fluids in accordance with this invention. Exemplary of the materials not suitable for the preparation of aqueous fluids in accordance with this invention are the water soluble magnesium salts, e.g., magnesium chloride, which reacts with the hydroxyl ion in the aqueous fluid or the calcium hydroxide therein to form a resulting water insoluble magnesium hydroxide. Water soluble carbonates, e.g., sodium carbonate, are also not suitable in the preparation of aqueous fluids in accordance with this invention since the carbonate portion thereof reacts with calcium ion present in the aqueous fluids to yield the resulting water insoluble calcium carbonate. Ammonium salts, e.g., ammonium nitrate, are also not suitable for use in the preparation of drilling fluids in accordance with the practice of this invention since the ammonium portion thereof reacts with the calcium hydroxide (hydroxyl ion) therein to form the unstable compound ammonium hydroxide, which forms and releases ammonia leading to the continued depletion and neutralization of the calcium hydroxide or hydroxyl ion in the aqueous fluid. Acidic salts such as sodium dihydrogen phosphate are likewise not suitable. Metal salts, the hydroxides of which are water insoluble, such as aluminum chloride, ferric chloride, chromium chloride and the like are also not suitable for use in the preparation of aqueous fluids in accordance with this invention.

The employment of water soluble inorganic chromate salts in the preparation of the aqueous well completion or workover fluids is the subject matter of copending patent application of John S. Brukner and Charles C. Nathan, Serial No. 856,921, filed December 3, 1959.

Organic compounds which are suitable for the preparation of aqueous drilling fluids of the type described herein include the water soluble carbohydrates or sugars such as sucrose, glucose, dextrose and the like. Other suitable water soluble organic compounds are known.

Preferred as the water soluble compound in the preparation of the aqueous drilling fluids of this invention is sodium nitrate. Sodium nitrate is greatly soluble in water and exhibits an increased solubility with increasing temperature. More specifically, at 80° F. sodium nitrate solutions may be prepared having a maximum density of about 11.6 lbs. per gallon. At 120° F. an aqueous solution of sodium nitrate may be prepared having a density of about 11.9 lbs. per gallon. Additionally, sodium nitrate solutions are non-corrosive, safe to handle, non-toxic and stable.

In accordance with one feature of the practice of this invention the aqueous fluids may be prepared by the separate addition of the various ingredients or components thereof or these ingredients may be added simultaneously in one additive admixture. Accordingly, a solid additive admixture composition comprising lime, a water soluble calcium salt, such as calcium chloride, and a suitable water soluble compound may be added directly to water to yield an aqueous fluid having a composition in accordance with this invention. A particularly suitable dry solids admixture suitable for the preparation of the aqueous fluids of this invention comprises an admixture of lime, calcium chloride and sodium nitrate in the weight range ratio 1:1–5:5–50. These additive admixtures may be added to water in any amount to attain the desired alkalinity, calcium ion concentration and specific gravity in the resulting aqueous fluid.

In addition to the lime, water soluble calcium salt and water soluble compound incorporated in aqueous fluids prepared in accordance with this invention there may also be incorporated therein other suitable materials such as oil, emulsifying agents, synthetic detergents or surface active or suface tension reducing agents, corrosion inhibitors and the like as may be desired or deemed suitable.

The following is illustrative of the practice of this invention. Aqueous fluids having a composition in accordance with this invention were prepared by incorporating varying amounts of lime and calcium chloride in saturated aqueous solutions of sodium nitrate, the aqueous solutions being saturated with sodium nitrate at room temperature, about 75° F. Although these aqueous solutions contained a rather high amount of sodium nitrate dissolved therein, thereby yielding a very high sodium ion concentration, the shale hardening properties of these solutions prepared in accordance with this invention were satisfactory. For example, it was observed that these aqueous solutions containing lime in the amount of 1 lb. per barrel and having a calcium ion concentration of 400 parts per million by weight and a filtrate alkalinity of 1.45 cc. of N/50 sulphuric acid satisfactorily prevented shale hydration or swelling and evidenced shale hardening properties. As the calcium ion concentration of these solutions were increased by incorporating therein calcium chloride in amounts as high as 3 lbs. per barrel solution and higher satisfactory shale hardening was still observed.

It was noted, however, that for best results with respect to shale hardening the concentration of calcium in the aqueous fluids should be below 1000 p.p.m. and desirably the alkalinity of the aqueous fluid should be maintained at about 1.0 cc. of N/50 sulphuric acid. Aqueous drilling fluids meeting these requirements were readily obtained by incorporating lime and calcium chloride in the saturated sodium nitrate solutions in an amount of about 1 lb. per barrel and 1–3 lbs. per barrel, respectively. It was observed that at a high level of calcium ion concentration in the aqueous fluids, i.e., a calcium ion concentration substantially in excess of 1000 p.p.m., e.g., in the range 2000–10,000, and a filtrate alkalinity below about 1.0, such as a filtrate alkalinity of 0.70 cc., shale hardening took place but proceeded at a slower rate.

Filtrate alkalinity as used hereinabove is defined as the number of cc. of N/50 $H_2SO_4$ required to titrate 1 cc. of the aqueous fluid to a phenolphthalein end point and is a measure of the soluble hydroxyl ion content thereof.

As will be apparent to those skilled in the art many modifications, substitutions and alterations are possible in the practice of this invention without departing from the spirit or scope thereof.

I claim:
1. A well completion and workover fluid consisting essentially of an aqueous solution substantially free from suspended and colloidal solids, said aqueous solution being substantially saturated with calcium hydroxide and containing dissolved therein a water-soluble calcium salt having a solubility in water greater than that of calcium hydroxide in an amount sufficient to yield a total calcium ion concentration in excess of 200 but below 2,000 parts per million by weight, and having dissolved therein a substantial amount up to the point of saturation of a water-soluble alkali metal compound compatible and non-reactive with said aqueous phase to materially increase the specific gravity of said aqueous solution, said compound being selected from the group consisting of the alkali metal nitrates, nitrites, chlorates, acetates, citrates, potassium chloride and lithium chloride, said solution having a pH in the range of 10.2 to 12.6 and an alkalinity above 0.70 cc. of N/50 sulphuric acid per cc. of solution to phenolphthalein end point, the said fluid being effective to solidify and harden shaley and bentonitic type material in contact therewith in spite of the high alkali metal ion concentration thereof.

2. A composition in accordance with claim 1, wherein said water soluble compound is sodium nitrate.

3. A composition in accordance with claim 1, wherein said water soluble compound is potassium nitrate.

4. A composition in accordance with claim 1, wherein said water soluble compound is sodium nitrite.

5. A well completion and workover fluid consisting essentially of a substantially saturated aqueous solution of sodium nitrate, about 1 pound per barrel of said solution of added lime, and about 1 to 3 pounds per barrel of said solution of added calcium chloride dissolved therein, said solution being substantially free from suspended and colloidal solids and substantially saturated with calcium hydroxide, having a calcium ion concentration in excess of 200 but below 2,000 parts per million by weight, a pH in the range of 10.2–12.6 and an alkalinity above 0.70 cc. of N/50 sulphuric acid per cc. of solution to phenolphthalein end point, said fluid having the property of solidifying and hardening shaley and bentonitic type material of a formation surrounding a bore hole in contact therewith to thereby avoid objectionable sealing off and reduction in the permeability of said formation.

6. A well completion and workover fluid consisting essentially of an aqueous solution substantially free from suspended and colloidal solids and containing about 1 pound of lime per barrel, 1 to 3 pounds of calcium chloride per barrel, and sufficient sodium nitrate within the range of 5 to 50 pounds per barrel to form a saturated aqueous solution.

7. In the completion of a well more penetrating a subsurface earth formation containing hydratable shaley material penetrated by a well bore wherein the well bore opposite the formation is filled with a solids-free aqueous fluid having dissolved therein a substantial amount of a water-soluble alkali metal compound selected from the group consisting of the alkali metal nitrates, nitrites, chlorates, citrates, potassium chloride and lithium chloride, to increase the specific gravity thereof while tending to prevent shale hydration and swelling, the improvement which comprises adding to said aqueous alkali metal compound solution, lime and a water-soluble calcium salt which has a solubility in said aqueous phase greater than that of calcium hydroxide to provide an aqueous solution of said alkali metal compound substantially free from suspended and colloidal solids which is substantially saturated with calcium hydroxide, has a calcium ion content above 200 but below 2,000 parts per million by weight, a pH within the range of 10.2 to 12.6 and an alkalinity above 0.70 cc. of N/50 sulphuric acid per cc. of solution to phenolphthalein end point, and supplying said aqueous solution to said well bore opposite said formation to concomitantly harden and structurally stabilize said shaley material in spite of the presence of the high alkali metal ion concentration therein.

References Cited in the file of this patent

UNITED STATES PATENTS

| | | |
|---|---|---|
| 2,793,996 | Lummus | May 28, 1957 |
| 2,802,783 | Weiss et al. | Aug. 13, 1957 |
| 2,805,722 | Morgan et al. | Sept. 10, 1957 |
| 2,862,881 | Reddie | Dec. 2, 1958 |
| 2,885,358 | Reddie | May 5, 1959 |

UNITED STATES PATENT OFFICE
CERTIFICATE OF CORRECTION

Patent No. 3,000,818 September 19, 1961

Robert H. Abbott, Jr.

It is hereby certified that error appears in the above numbered patent requiring correction and that the said Letters Patent should read as corrected below.

Column 5, line 3, for "more" read -- bore --.

Signed and sealed this 30th day of January 1962.

(SEAL)
Attest:

ERNEST W. SWIDER

Attesting Officer

DAVID L. LADD
Commissioner of Patents